United States Patent [19]

Viewegh et al.

[11] 4,264,835
[45] Apr. 28, 1981

[54] SLOT CLOSURE FOR THE SEMI-CLOSED SLOTS OF AN ELECTRIC MACHINE STATOR

[75] Inventors: Gerhard Viewegh, Grossschwarzenlohe; Hermann Schmidt, Nuremberg; Paul Pirner, Altdorf, all of Fed. Rep. of Germany

[73] Assignee: Siemens Aktiengesellschaft, Berlin and Munich, Fed. Rep. of Germany

[21] Appl. No.: 936,949

[22] Filed: Aug. 25, 1978

[30] Foreign Application Priority Data

Sep. 2, 1977 [DE] Fed. Rep. of Germany ....... 2739648

[51] Int. Cl.³ .............................................. H02K 3/48
[52] U.S. Cl. .................................... 310/214; 310/194
[58] Field of Search ................. 310/214, 194, 215, 42; 336/259, 197

[56] References Cited

U.S. PATENT DOCUMENTS

| 2,443,455 | 6/1948 | Herman | 310/214 |
| 2,443,456 | 6/1948 | Herman | 310/214 |
| 2,443,457 | 6/1948 | Herman | 310/214 |
| 2,615,944 | 10/1952 | Carlson | 310/214 |
| 2,701,317 | 2/1955 | Herman | 310/215 |
| 2,921,208 | 1/1960 | Morrill | 310/214 |
| 2,998,540 | 8/1961 | Phillips | 310/214 |
| 3,909,648 | 9/1975 | Clark | 310/194 |
| 4,075,522 | 2/1978 | Hoffman | 310/214 |

Primary Examiner—R. Skudy
Attorney, Agent, or Firm—Kenyon & Kenyon

[57] ABSTRACT

A slot closure for the semi-closed slots of the stator of an electric machine is disclosed. The slot closure comprises slot closing bars interconnected in a ladder-like arrangement by flexible strips. Flexing of the strips by about 90° correspondingly rotates individual bars and permits them to be successively inserted edge-wise through the slot openings. Advantageously, the ladder-like arrangement of bars and strips is made of a moldable or stampable material.

8 Claims, 3 Drawing Figures

SLOT CLOSURE FOR THE SEMI-CLOSED SLOTS OF AN ELECTRIC MACHINE STATOR

BACKGROUND OF THE INVENTION

The present invention relates to a slot closure for the semiclosed slots of the stator of an electric machine, and more particularly to slot closing bars for closing the slots.

The winding inserted in the slots of an electric machine stator must be properly secured so that individual wires will not protrude out of the slots where they could then be damaged, particularly by wiping against the rotor. To prevent this, it is known to fasten the winding including the coil ends by applying varnish to it. It is also known to secure the winding by the use of slot closing bars inserted in the axial direction on the outside of the slot.

SUMMARY OF THE INVENTION

It is an object of the present invention to provide a slot closure for an electric machine which is much easier to produce and to assemble into the machine.

This and other objects of the present invention are achieved by providing elastically interconnected slot closing bars.

In accordance with the invention, the slot closure comprises slot closing bars elastically interconnected in a ladder-like arrangement by strips provided at the ends of the bars. The strips are flexible so that the individual slot closing bars can be successively inserted into the slots through the respective slot openings upon a flex or twist of the strips of about 90°. The bars are sized so that they will pass through respective slot openings edgewise upon being axially rotated about 90° and will close the openings upon being returned to their unrotated position with the strips in their normal untwisted state. The slot closing bars connected to each other in ladder-like form are preferably made of a moldable or stampable material to advantageously achieve simple production thereof.

These and other aspects of the invention will be more apparent from the following description of the preferred embodiment thereof when considered with the accompanying drawings and appended claims.

BRIEF DESCRIPTION OF THE DRAWINGS

The present invention is illustrated by way of example and not limitation in the figures of the accompanying drawings in which like references indicate similar parts and in which.

DESCRIPTION OF THE PREFERRED EMBODIMENT

Figure 1:
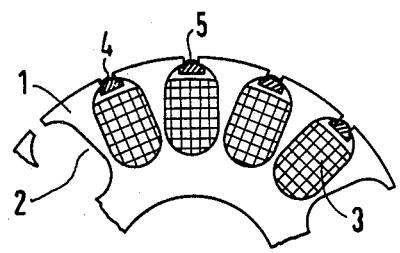
FIG. 1 is a cross-section view of a stator segment with semiclosed slots, sectioned along line I—I of FIG. 2.

Referrring more particularly to the drawings, the stator 1 shown in FIG. 1 is assembled in a conventional manner and includes individual stator laminations and semiclosed slots 2. The stator 1 shown in FIG. 1 is for an external rotor motor. Varnish is applied conventionally through the slot opening 4 to the stator winding 3 inserted in the slots 2. Slot closing bars 5 are provided to close slot openings 4 to prevent the individual wires of the winding 3 from protruding from the slot openings.

Figure 2:
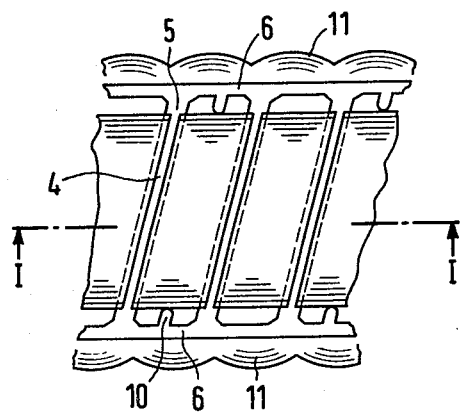
FIG. 2 is a top view of a segment of the stator according to the invention.

Referring to FIG. 2, the individual slot closing bars 5 are interconnected by strips 6 provided at the ends of the bars. The slot closing bars 5 interconnected by the strips 6 are made of a moldable or stampable material, for example a thermoplastic material. The dimensions of the strips 6 are such that the individual slot closing bars can successively be inserted into the slots 2 radially, the cross-section of the slot closing bars being appropriately designed. The thickness of the slot closing bars corresponds essentially to the width of the slot opening 4 so that a respective slot closing bar can be inserted edgewise into a respective slot 2 upon twisting the strips 90° to correspondingly rotate individual bars. After a slot closing bar 5 is inserted into the slot, the strip is twisted back to rotate the respective bar back by about 90° so that the bar assumes the position shown in FIGS. 1 and 2. The strips 6 are made of an appropriately deformable material to absorb the temporary twisting thereof when individually rotated bars are being inserted into a respective slot opening. Additionally, the winding in the slots 2 is disposed to leave sufficient room to safely accommodate the twisting motion and corresponding rotating of the bars.

Figure 3:
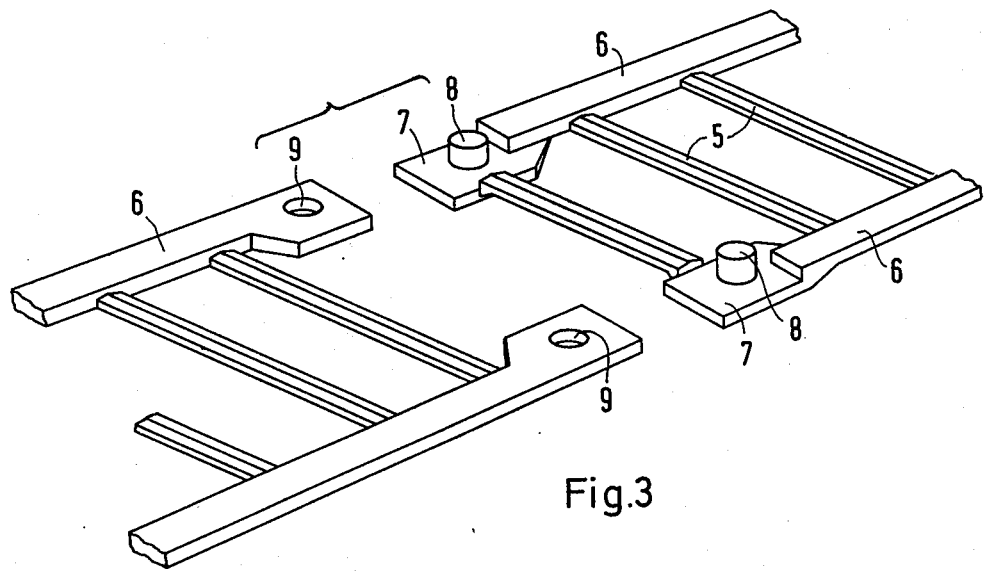
FIG. 3 is a schematic view of the ends of the slot closure in the form of ladder-like interconnected bars according to the invention.

As shown in FIG. 3, the cross-sectional shape of the side of the bars facing the slot opening 4 is triangular. This permits the slot closing bars to cover the slot opening uniformly. The individual slot closing bars are supported along their edges or ends on both sides of the slot opening 4, as shown in FIG. 1. Providing the appropriate length for the strips assists in supporting the bars. To insure that the bars are properly located and precisely fixed, both ends of the strips 6 are connected to each other by a snap arrangement. As shown in FIG. 3, the snap arrangement includes a protrusion 8 resembling a snap button formed on a tab 7 which itself is formed at the one end of the strips 6. The protrusion 8 engages a hole 9 appropriately provided at the other end of the strips 6. After the protrusion 8 and hole 9 are engaged, the snap connection may be additionally secured against loosening or unfastening by heat deformation of the protrusions 8.

For easier insertion of the slot closing bars 5 into the slot openings 4, the slot closing bars 5 are longer than the lamination stack of the stator 1, as shown in FIG. 2. In order to properly secure and fix the slot closing bars 5 in the axial direction, limiting tabs 10 are formed on the strips 6. The tabs prevent axial movement of the slot closing bars and secure the slot closure axially in both directions. The strips 6 may also be used to help support the coil heads 11 as shown in FIG. 2.

The twisting action required during the assembly of the slot closure bars is made possible by forming the strips of a suitably elastic, plastic material. The snap, button-like closure arrangement permits a closed ring to be formed whose diameter is selected to enable the slot closing bar 5 to assume the position shown in FIG. 1.

The advantages of the present invention, as well as certain changes and modifications of the disclosed embodiments thereof, will be readily apparent to those skilled in the art. It is the applicants' intention to cover by their claims all those changes and modifications which could be made to the embodiments of the invention herein chosen for the purpose of the disclosure without departing from the spirit and scope of the invention.

What is claimed is:

1. A one-piece slot closure for semi-closed slots of the stator of an electric machine comprising slot closing bars having a width exceeding the width of the openings in the slots and a thickness which is essentially not greater than the width of the slot openings, the slot closing bars being elastically interconnected in a ladder-like arrangement by a flexible strip provided at each of opposed ends of the bars, the ladder-like arrangement being generally flat in its free state with the strips longitudinally extending across the width of the bars, each strip being capable of being flexed to an angle of about 90° from its free state to permit rotation of a respective bar by about 90° with respect to an adjacent bar so that the bar width of a rotated bar is adapted to extend generally radially with respect to a slot opening, and means for engaging ends of the ladder-like arrangement in a flexed, closed ring configuration thereof.

2. The slot closure according to claim 1, wherein the ladder-like arrangement of slot closing bars and strips is formed of a moldable material.

3. The slot closure according to claim 1, wherein the ladder-like arrangement of slot closing bars and strips is formed of a stampable material.

4. The slot closure according to claim 2 or 3, wherein the ladder-like arrangement of the bars and strips is made of a thermoplastic material.

5. The slot closure according to claim 1, wherein said means for engaging comprises a snap closure arrangement provided at opposed ends of the ladder-like arrangement, engagement of the snap closure arrangement forming the closed ring of the ladder-like arrangement.

6. The slot closure according to claim 5, wherein the snap closure arrangement comprises protrusions extending from the ends of the strips of one end of the ladder-like arrangement and openings provided in the ends of the strips of another end of the ladder-like arrangement adapted to engage the protrusions.

7. The slot closure according to claim 1, wherein the cross-sectional shape of the side of the slot closing bars facing the slot opening is triangular.

8. The slot closure according to claim 1, wherein the slot closing bars are longer than the lamination stack of the rotor and wherein the flexible strips include axially disposed limiting tabs extending inwardly therefrom adapted to engage the lamination stack and secure the slot closure axially in both directions.

* * * * *